United States Patent
D'Sa et al.

(10) Patent No.: US 7,334,115 B1
(45) Date of Patent: Feb. 19, 2008

(54) DETECTION, RECOVERY AND PREVENTION OF BOGUS BRANCHES

(75) Inventors: Reynold V. D'Sa, Portland, OR (US); Alan B. Kyker, Portland, OR (US); Slade A. Morgan, Forest Grove, OR (US); Rebecca E. Hebda, Sherwood, OR (US); Richard A. Weier, Tigard, OR (US); Robert F. Krick, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 09/608,512

(22) Filed: Jun. 30, 2000

(51) Int. Cl.
*G06F 9/30* (2006.01)
(52) U.S. Cl. .................................... 712/239
(58) Field of Classification Search ................ 712/233, 712/239, 240
See application file for complete search history.

(56) References Cited

U.S. PATENT DOCUMENTS

| | | | | |
|---|---|---|---|---|
| 4,574,344 A | * | 3/1986 | Harris et al. ................ | 703/26 |
| 4,761,733 A | * | 8/1988 | McCrocklin et al. ........ | 711/212 |
| 5,864,697 A | * | 1/1999 | Shiell .......................... | 712/240 |
| 5,956,495 A | * | 9/1999 | Kahle et al. ................. | 703/26 |
| 6,088,793 A | * | 7/2000 | Liu et al. .................... | 712/239 |
| 6,851,043 B1 | * | 2/2005 | Inoue .......................... | 712/217 |

* cited by examiner

*Primary Examiner*—Tonia L. Meonske
(74) *Attorney, Agent, or Firm*—Kenyon & Kenyon LLP

(57) ABSTRACT

The present invention provides for a method and apparatus for the detection and prevention of and recovery from bogus branch predictions in a microprocessor. Micro-ops, decoded from a macro instruction, are stored in a decoded micro-op cache. Branch prediction logic determines whether a branch is bogus or not. If the branch taken was determined to be bogus, the present invention causes the micro-ops which descend from the original bogus branch micro-op instruction to be flagged and subsequently moved to the back-end of the processor for retirement. Further, the branch prediction logic (the branch prediction logic storage buffer) is updated as to what the actual direction of the branch was. In this manner then, bogus branches are detected, recovered from and further prevented.

25 Claims, 3 Drawing Sheets

DETECTION, RECOVERY AND PREVENTION OF BOGUS BRANCHES

FIELD OF THE INVENTION

The present invention relates to improvements to an instruction pipeline in a microprocessor, and more particularly, to a method and apparatus for the detection of, recovery from and prevention of bogus branches in an instruction pipeline having a decoded micro-op cache.

BACKGROUND INFORMATION

Modern central processing units (CPUs), such as, for example, Intel's Pentium® and Pentium® Pro microprocessors, include instruction pipelines in order to increase program execution speed. In the Intel Pentium® Pro microprocessor, for example, one pipeline includes an instruction fetch unit (IFU), an instruction decode unit (ID), and an instruction execution unit (EX). Each unit has its own functions, that is the IFU fetches program instructions, while the ID translates the instructions into micro-ops and the EX executes the micro-ops. Furthermore, in the pipeline arrangement, the IFU fetches instructions while the other units operate on previously fetched instructions.

During normal operation, the IFU fetches instructions from a main memory sequentially until a branch instruction is fetched. If the branch instruction is a conditional branch, branch prediction logic, in particular a branch table buffer (BTB), predicts whether or not the branch will be taken when the branch instruction is executed. The BTB includes a cache for storing previous branch predictions which contains 128 sets of 4 entries each. If the BTB predicts that the branch will not be taken, the IFU continues to fetch instructions sequentially. If the BTB instead predicts that a branch will be taken, the BTB instructs the IFU to instead fetch instructions starting from the branch target address. When the branch instruction is executed, a jump execution unit (JEU) (a component within the EX) instructs the BTB as to whether or not the branch was actually taken or not taken.

Unfortunately, however, in some microprocessors it is possible for the BTB to: (1) predict that a branch will occur at an address that does not contain a branch, or (2) predict a branch that will have a target address that is invalid. Such "bogus branch" predictions can occur for several reasons. First, the BTB stores an incomplete address, or "tag", for its internal processing, which can cause the BTB to predict a branch at an incorrect address that shares the same tag as that of the correct address. For example, if the IFU should properly be directed to address 10A, the BTB may only store the tag xx0A. In such a case, the BTB may improperly direct the IFU to address 20A or 40A. Second, the BTB may predict a branch at an incorrect address when processing self-modifying code. In this case, it is possible that the code was changed for some outside reason and the predicted branch was eliminated.

"Bogus branch" predictions for reasons such as these, as well as others, slow down processing speeds and in worst case scenarios can lead to a catastrophic microprocessor failure (i.e., a flushing of the BTB and/or machine's pipeline; a crash). Prevention of and recovery from the execution of these bogus branches is therefore of paramount importance. Currently, the Pentium® Pro microprocessor detects some of these bogus branch problems by use of a branch address calculator (BAC). The BAC's functions include verifying that the BTB has not predicted that an unconditional branch will not be taken, and alternatively, insuring that there is actually a branch at the address the BTB predicts a branch would occur. In the case of a direct branch, that is a branch with a fixed target address, the BAC also verifies the existence of the branch's target. In the case of an indirect branch, however, where the target address is a function of another variable, the JEU verifies the presence of the branch target.

While some bogus branch detection can occur in a microprocessor such as the Pentium® Pro microprocessor, there remains, however, a need for a method and apparatus by which recovery from and prevention of bogus branches in an instruction pipeline effect only a minimal change in current pipeline procedures.

DETAILED DESCRIPTION

Figure 1:
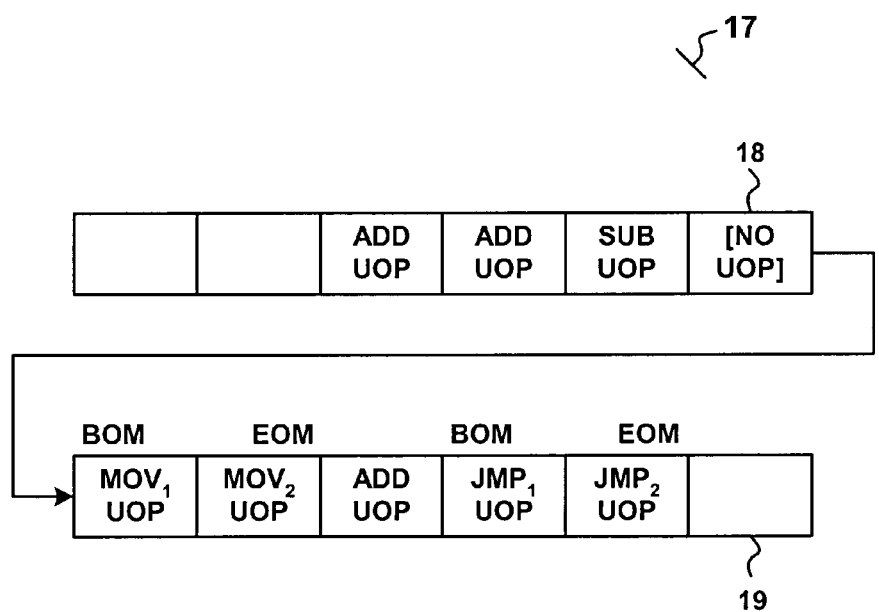
FIG. 1 illustrates an architecture of a decoded micro-op cache in which a series of micro-ops are stored, according to an embodiment of the present invention.
Figure 2:
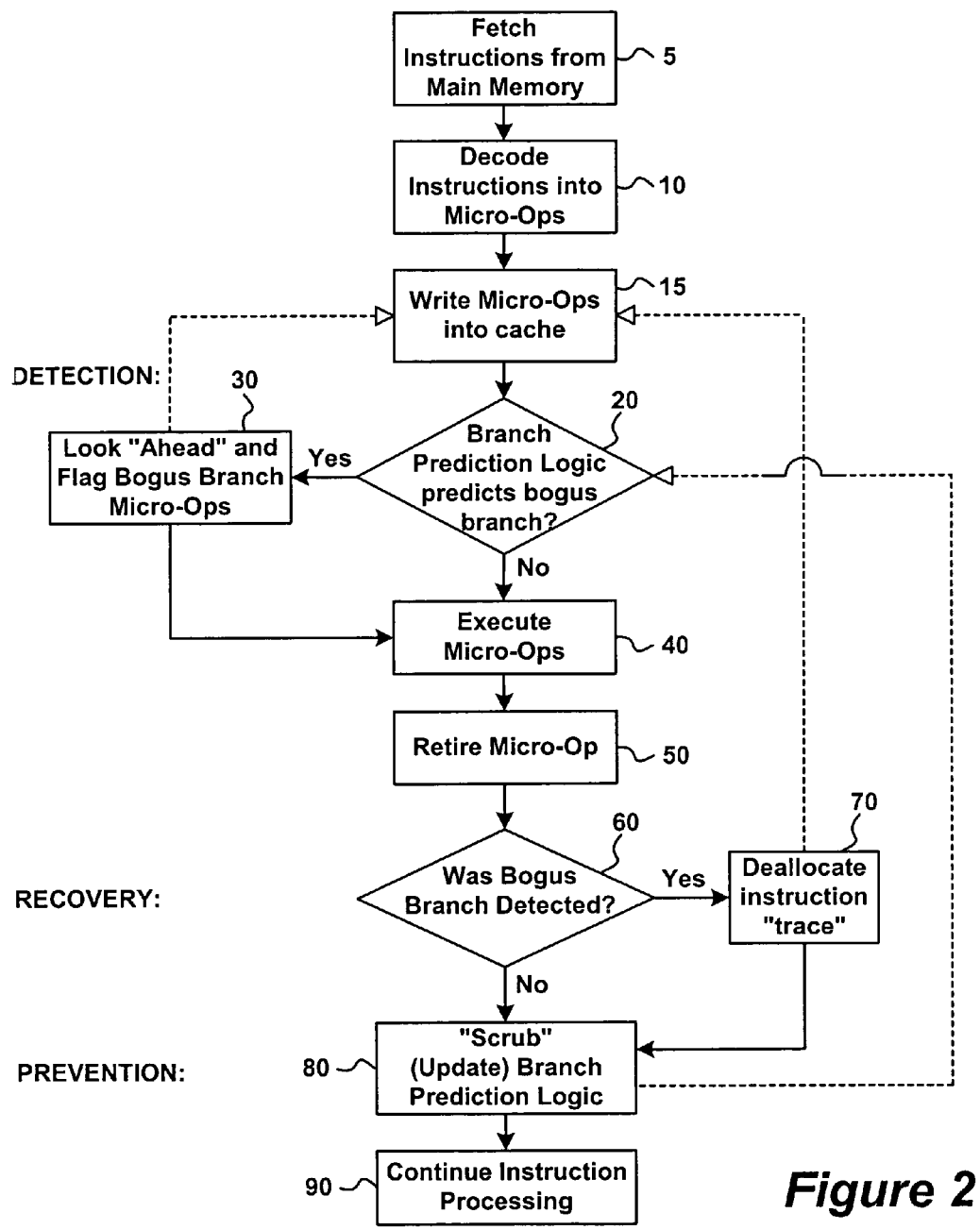
FIG. 2 illustrates a flow chart of a method for the recovery from and prevention of a bogus branch in an instruction pipeline of a microprocessor, according to an embodiment of the present invention.
Figure 3:
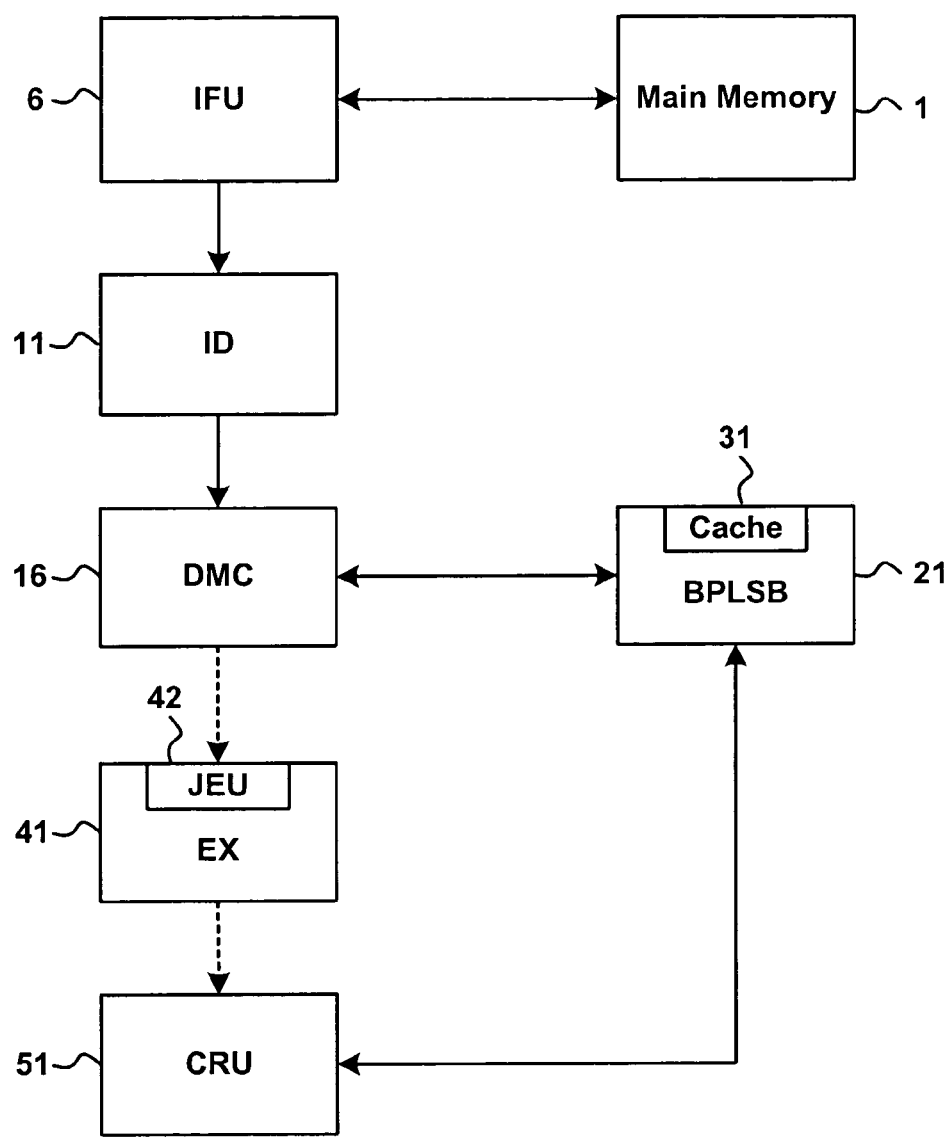
FIG. 3 illustrates an architecture of an apparatus for the recovery from and prevention of a bogus branch in an instruction pipeline of a microprocessor, according to an embodiment of the present invention.

Referring to FIGS. 1 through 3, the present invention relates to a method and apparatus for the detection and prevention of and recovery from bogus branches in an instruction pipeline.

In a proposed new architecture, the instruction pipeline includes branch prediction logic for predicting whether or not micro-op branches will be taken when the micro-op instruction is eventually executed. More particularly, the ID translates each program instruction (i.e., macro-instruction) into one or more micro-ops. A decoded micro-op cache (DMC) receives the series of micro-ops and stores the macro instructions in the form of the micro-ops in cache memory. The DMC stores the micro-ops of the decoded instructions in the order the BTB predicts they should be executed. The EX obtains instructions either "streamed" from the DMC (if a particular instruction trace is currently stored in cache, i.e., a cache hit) or from the IFU through the ID (i.e., in the event of a cache miss) in which case the trace is "built" in the DMC.

If a particular macro-instruction is a branch instruction, trace branch prediction logic, in particular, a branch prediction logic storage buffer (BPLSB), predicts whether or not the branch will be taken when the branch is obtained from the DMC. Upon such a determination, micro-ops which descend from the bogus branch are flagged. Such detection allows the micro-ops to then be deallocated from the DMC by a retirement unit, thereby ensuring recovery. In order to prevent further bogus branch instructions from being executed by the EX, the present invention scrubs the branch prediction logic of the BPLSB.

Referring now specifically to FIG. 1, an example of an architecture of a decoded micro-op cache in which a series of micro-ops may be stored is shown. In this example, a portion of decoded micro-op cache 17 contains two sets 18 and 19 each with six possible entries. Furthermore, in this example, the first set 18 has two types of macro instructions, an ADD UOP and a SUB UOP, inserted in three micro-op entries. In set 19, three macro instructions are contained in five micro-op entries, a $MOV_1$ UOP, a $MOV_2$ UOP, an ADD UOP, a $JUMP_1$ UOP, and a $JUMP_2$ UOP. Furthermore, each macro instruction has a beginning of the macro instruction, indicated as BOM, and an end of the macro instruction, indicated as EOM. Thus, in the example, the $MOV_1$ UOP is the BOM of the macro MOV instruction while the $MOV_2$ UOP is the EOM of the macro MOV instruction. The same is true for the JMP macro instruction as it too has been decoded into two micro-ops.

In the instance of the above example, as the entire macro MOV instruction (i.e., the $MOV_1$ UOP and the $MOV_2$ UOP) could not fit in set 18, the decoded micro-op cache 17 moves the two MOV UOPs to the beginning of set 19 as indicated by the arrow in the Figure. Such movement creates a gap in set 18 as indicated by the entry of "[no UOP]". Because of the BOM and EOM in one set constraint and the resultant movement of the entire macro-op made up of two micro-ops into a new set, and as the BPLSB must make branch predictions for macro instructions based on the positioning of the EOM, it is possible that the BPLSB will predict a bogus branch as occurring. For instance, bogus branch predictions may be made by the BPLSB as a result of the gap because the BPLSB stores pointers to particular entries in the decoded micro-op cache based only on the position of the micro-op at the beginning of the decoded micro-op cache set and utilizes an offset value denoting the number of micro-ops between the beginning of the decoded micro-op cache set and the particular entry. If the entry is a gap, the BPLSB might think there is a branch due to a previous BPLSB allocation. Moreover, the BPLSB is not dynamically updated as the sets in the decoded micro-op cache are booked, streamed and removed. Thus, if the entries of the decoded micro-op cache change due to new micro-ops being written into the decoded micro-op cache, it is possible for the BPLSB to predict that a branch exists in the decoded micro-op cache that presently does not actually exist. This is called decoded micro-op cache "victimization" and is a major cause of bogus branches.

Referring now specifically to FIG. 2, execution of a method for the recovery from and prevention of bogus branches in an instruction pipeline is shown. In Step 5, an instruction fetch unit (IFU) fetches instructions from a main memory. Fetching of instructions may be either in a "in-order" or "out-of-order" execution type computer microprocessor. That is, instructions fetched by the IFU from the main memory in an "in-order" computer machine are executed in a designated order, while those fetched in an "out-of-order" computer machine are executed in a random order. Accordingly, it is to be understood, that the method of the present invention can be applied to either execution type of computer machine. Further, it is to also be understood, that the main memory may be co-located with the microprocessor or may be from an external source.

Upon fetching of a proper instruction by the IFU, in Step 10, an instruction decode unit (ID) decodes the macro instructions fetched into a number of micro operations (micro-ops). Such decoding, or translation, of the instruction into a micro-op is well known in the industry and is a function designed to speed processing.

Upon appropriate decoding/translation of the instructions into micro-ops by the ID, the micro-ops are written into a cache as an instruction "trace" in Step 15. The branch table buffer (BTB) instructs the microprocessor as to in which order the micro-ops will be written into the cache. Such ordering is dependent upon how the BTB predicts the micro-ops will be executed. The cache of the present invention can be called a "decoded micro-op cache" and is designed to contain 256 sets that each hold 6 micro-ops. If a particular macro instruction that has been decoded into a number of micro-ops, such macro instruction requiring more than one micro-op, the decoded micro-op cache (DMC) ensures that the micro-ops are stored on the same set of the decoded micro-op cache. In other words, if a single instruction requires more than one micro-op, the DMC ensures that each micro-op is stored on the same set. If a particular set does not have sufficient room for the entire number of micro-ops of the macro instruction to be stored on that set, the DMC will place the micro-op on the next available set in which it will fit. This procedure was discussed in further detail above in relation to FIG. 1.

Once each micro-op of a macro instruction has been written into the decoded micro-op cache, in Step 20 branch prediction logic makes a prediction. The prediction could be a valid prediction on a valid branch or it could be a bogus prediction. Prediction logic is applied that determines whether or not the prediction is a bogus branch prediction. In particular, the branch prediction logic storage buffer (BPLSB) of the present invention will predict whether or not a bogus branch will be taken when the branch instruction is obtained from the decoded micro-op cache. If, in fact, a bogus branch is predicted, in Step 30 the present invention will start to perform a recovery by looking ahead in the instruction pipeline and "flagging" each of the bogus branch micro-ops which precede the micro-op of the branch instruction that has just been predicted with a bogus prediction. As indicated by the dotted line in the Figure, each of these flagged micro-op instructions are now flagged as a bogus branch micro-op of a bogus branch macro instruction and, as will be described in further detail below, continue to flow to the back-end of the pipeline to the microprocessor retirement unit (CRU) for retirement.

Whether the branch prediction logic has predicted a branch or not, the micro processor continues processing in Step 40 with the instruction execution unit (EX) performing execution of the sequentially stored micro-ops. The EX retrieves micro-ops for execution from the decoded micro-op cache. Obtaining of these micro-ops by the EX may occur through retrieval from the DMC or from the IFU through the ID. In the case where the instructions are obtained by the EX from the DMC, they are "streamed", that is a particular instruction trace is currently stored in the cache (i.e., a cache hit). If the instructions are obtained by the EX from the IFU through the ID, then no micro-ops pertaining to the macro instruction currently reside in the decoded micro-op cache (i.e., in the event of a cache miss) and an instruction trace is built in the DMC.

Upon execution of each micro-op by the EX, in Step 50 each micro-op is retired in a microprocessor retirement unit. At this point, the retirement logic determines whether or not the micro-op was a part of a bogus branch instruction by looking in Step 60 to see if the bogus branch "flag" signal was attached to the instruction in the pipeline.

In the event that a bogus branch instruction has been detected as having been executed, in Step 70, the DMC will deallocate the instruction "trace" pertaining to that bogus branch instruction. As the instruction trace is a series of instructions along the predicted branch program path, and is stored in the form of a series of micro-ops in the decoded micro-op cache, the prediction of a bogus branch, or rather that a particular instruction is a bogus branch instruction, by the branch prediction logic results in a series of micro-op instructions, as indicated by the dotted line in the Figure, being deleted from the decoded micro-op cache such that the micro processor will not follow the branch instruction. This can be done by removing the specific branch, all branches in the set with the bogus branch instruction, by clearing the whole branch array, or any other deallocation method. It is to be understood, of course, that a "trace" as stored in the decoded micro-op cache may consist of any number of entries in one or more sets. In this manner then, the microprocessor flushes, or retires, all of the bogus branch micro-ops.

In Step 80, regardless of the determination that a bogus branch has in fact been detected, the micro processor will "scrub" (i.e., update) the branch prediction logic so as to prevent further predictions of bogus branches (that is, the BPLSB is updated as to what the actual direction was for the branch). Scrubbing consists of removing entries (i.e., deallocation) from the BPLSB that may later produce bogus branches because of DMC victimization (as described in relation to FIG. 1). In the case where the micro-ops from the bogus branch micro-op were not previously in the decoded micro-op cache but were built, and may have accordingly overwritten an old trace (e.g., one or more sets) in the decoded micro-op cache, the entry in the BPLSB relating to the branch of the old overwritten trace is deallocated as well. In an alternative embodiment, the BPLSB will deallocate all entries that are related to the branches in the old trace. In a further alternative embodiment, the BPLSB will deallocate all entries that are related to the branches in the old trace that are downstream from the retired branch instruction. It is to be further understood that for micro-ops that will never be retired, the machine check may in yet another alternative embodiment cause these micro-ops to "bogus retire" so that information regarding these possible bogus branches may be generated and forwarded to the BPLSB for actions similar to that taken with the retired instructions. In the above manner then, prevention of execution of bogus branches is obtained. This scrubbing can be done at retirement time or at trace build time depending upon the implementation.

Whether or not a bogus branch micro-op of a bogus branch instruction was detected, in Step 90, the microprocessor continues instruction processing as described above with the next micro-op.

Referring now specifically to FIG. 3, an architecture of an apparatus for the recovery from and prevention of a bogus branch instruction in an instruction pipeline of a microprocessor is shown. An instruction fetch unit 6 performs fetching of program instructions from a main memory 1. As described above, the execution of the fetched instructions may occur in a "in-order" or "out-of-order" method. Also, as described above, main memory 1 may be co-located with the microprocessor of the present invention or may be external.

Macro instructions fetched by the instruction fetch unit 6 are then decoded, or translated, by instruction decode unit 11. While the instruction is being decoded, the instruction fetch unit 6 retrieves additional instructions for further processing. Instruction decode unit 11 decodes instructions into a number of micro-ops. Accordingly, each instruction may contain one or more micro-ops.

Each micro-op can be written into a decoded micro-op cache 16. The decoded micro-op cache 16 receives the micro-ops from the instruction decode unit 11 and stores them in an order predicted by the branch table buffer (not shown). A branch prediction logic storage buffer 21 then provides branch prediction logic to the decoded micro-op cache. In this manner, the decoded micro-op cache and the branch prediction logic storage buffer 21 are linked, however, they need not be tied together such that data overwritten in one is necessarily overwritten in the other. A separate cache 31 can be co-located with the branch prediction logic storage buffer 21 for containment of the branch prediction logic as well as branch determination data.

Micro-ops retrieved from the decoded micro-op cache 16, and/or the instruction decode unit 11, are executed by the instruction execution unit 41. Instruction execution unit 41 is responsible for carrying out micro-op applications of a macro instruction. Co-located with instruction execution unit 41 is a jump execution unit 42. Jump execution unit 42 monitors whether or not execution unit 41 executes branch instructions. Upon completion of micro-operations, whether a branch instruction or not, an instruction retirement unit (CRU) 51 is responsible for retiring each operation thus executed. It is in the instruction retirement unit 51 that recovery from the detection of a bogus branch instruction (as indicated by the "flag" signals attached to the appropriate micro-ops is carried out, as well as prevention thereof as described above in relation to FIG. 2.

Thus, as can be seen, the method and apparatus of the present invention provide for the detection of, recovery from and prevention of bogus branches in a microprocessor. The present invention thus improves processor reliability and allows for smoother processing.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

The invention claimed is:

1. A method comprising:
    decoding a first macro instruction into at least one micro-op;
    writing the at least one micro-op into a decoded micro-op cache;
    predicting by branch prediction logic whether the at least one micro-op is a branch;
    executing the at least one micro-op;
    predicting if the at least one executed micro-op is a bogus branch of the first macro instruction; and
    continuing processing with a second macro instruction,
    wherein if the at least one executed micro-op is determined to be a bogus branch, then the method further comprises:
        flagging any other micro-ops which pertain to the at least one executed bogus branch micro-op;
        removing the flagged micro-ops for retirement; and
        scrubbing a branch prediction logic storage buffer upon which the branch prediction logic is based.

2. The method according to claim 1, further comprising: fetching from a main memory the macro instruction.

3. The method according to claim 1, wherein the at least one micro-op is written into the decoded micro-op cache in an order a branch table buffer predicts that the at least one micro-op should be executed.

4. The method according to claim 1, wherein executing the at least one micro-op is in at least one of an in-order or out-of-order fashion.

5. The method according to claim 1, wherein scrubbing the branch prediction logic storage buffer further comprises at least one of:

deallocating any other micro-ops pertaining to the at least one executed bogus branch micro-op;
deallocating at least one old set which had been overwritten in the decoded micro-op cache by a built instruction trace;
deallocating at least one entry that is related to a branch in at least one old set in the decoded micro-op cache; and
deallocating at least one entry that is related to a branch of at least one old set in the decoded micro-op cache that is downstream from the at least one executed bogus branch micro-op.

6. The method according to claim 1, further comprising:
determining if the branch has been taken.

7. A method comprising:
predicting whether a first micro-op is a bogus branch instruction; and
looking ahead in the instruction pipeline to at least one second micro-op related to the first micro-op,
wherein if the first micro-op is predicted to be a bogus branch, the method further comprises;
attaching a signal flag that indicates a bogus branch to the at least one second micro-op.

8. The method according to claim 7, further comprising:
decoding at least one macro instruction into the first micro-op and the at least one second micro-op; and
writing the first micro-op and the at least one second micro-op into a decoded micro-op cache.

9. The method according to claim 7, wherein the prediction of whether the first micro-op is a bogus branch instruction is based on branch prediction logic.

10. A method comprising:
predicting whether a first micro-op is a bogus branch; and
deallocating from a decoded micro-op cache at least one second micro-op related to the first micro-op.

11. The method according to claim 10, wherein predicting whether the first micro-op is a bogus branch is based on branch prediction logic.

12. The method according to claim 10, wherein deallocating from the decoded micro-op cache the at least one second micro-op is accomplished by checking whether a bogus branch signal flag has been attached to the at least one second micro-op.

13. The method according to claim 10, wherein deallocating further comprises at least one of:
removing the specific bogus branch;
removing all branches in a set with the bogus branch;
removing all branches in the decoded micro-op cache; and
clearing the entire decoded micro-op cache.

14. A method comprising:
writing at least one micro-op into a decoded micro-op cache;
retiring the at least one micro-op, said retiring including predicting an actual result for the retired at least one micro-op; and
removing entries from a branch prediction logic storage buffer that would later produce bogus branches.

15. The method according to claim 14, wherein scrubbing the branch prediction logic storage buffer comprises at least:
comparing what an actual result of the retired at least one micro-op is to an instruction trace in the branch prediction logic storage buffer.

16. The method according to claim 14, wherein removing entries from the branch prediction logic storage buffer further comprises at least one of:
deallocating any other micro-ops pertaining to the at least one retired micro-op;
deallocating at least one old set which had been overwritten in the decoded micro-op cache by a built instruction trace;
deallocating at least one entry that is related to a branch in at least one old set in the decoded micro-op cache; and
deallocating at least one entry that is related to a branch of at least one old set in the decoded micro-op cache that is downstream from the at least one retired micro-op.

17. The method according to claim 14, wherein removing entries can be accomplished at the time of at least one of writing or retiring.

18. An apparatus comprising:
a decoded micro-op cache into which are written at least one decode micro-op of a macro instruction;
a branch prediction logic storage buffer for predicting whether a branch will be taken upon execution of the at least one decoded micro-op;
an instruction execution unit for executing the at least one micro-op; and
an instruction retirement unit which predicts whether the at least one micro-op is of a bogus branch macro instruction,
wherein if the instruction retirement unit determines the at least one micro-op is of a bogus branch macro instruction,
any other micro-ops stored in the decoded micro-op cache pertaining to that bogus branch macro instruction are flagged and removed to the instruction retirement unit for retirement
and the branch prediction logic storage buffer is scrubbed.

19. The apparatus according to claim 18, further comprising:
a main memory in which the macro instruction is stored; and
an instruction fetch unit for fetching the macro instruction from the main memory.

20. The apparatus according to claim 18, further comprising:
an instruction decode unit for translating the macro instruction into the at least one decoded micro-op.

21. The apparatus according to claim 18, further comprising:
a jump execution unit which determines whether a branch was taken upon execution of the at least one decoded micro-op.

22. The apparatus according to the claim 18, wherein the branch prediction logic storage buffer applies branch prediction logic to predict whether a branch will be taken upon execution of the at least one decoded micro-op.

23. The apparatus according to claim 18, wherein if the branch prediction logic storage buffer predicts a branch will be taken upon execution of the at least one decoded micro-op, an instruction trace is built pertaining to the predicted branch.

24. The apparatus according to claim 23, wherein the built instruction trace is inserted into the decoded micro-op cache such that the micro-ops of the branch macro-instruction are executed.

25. The apparatus to claim 18, wherein the branch prediction logic storage buffer is scrubbed by deallocation of at least one of
any other micro-ops pertaining to the bogus branch macro instruction, any old set which had been overwritten in the decoded micro-op cache by a built instruction trace, all entries that are related to any branches in the old set, and all entries that are related to the branches in the old set that are downstream from the retired branch macro instruction.

* * * * *